(No Model.)
H. F. HAYDEN.
APPARATUS FOR GENERATING GAS AND VAPOR FROM LIQUID HYDROCARBONS.
No. 277,567. Patented May 15, 1883.
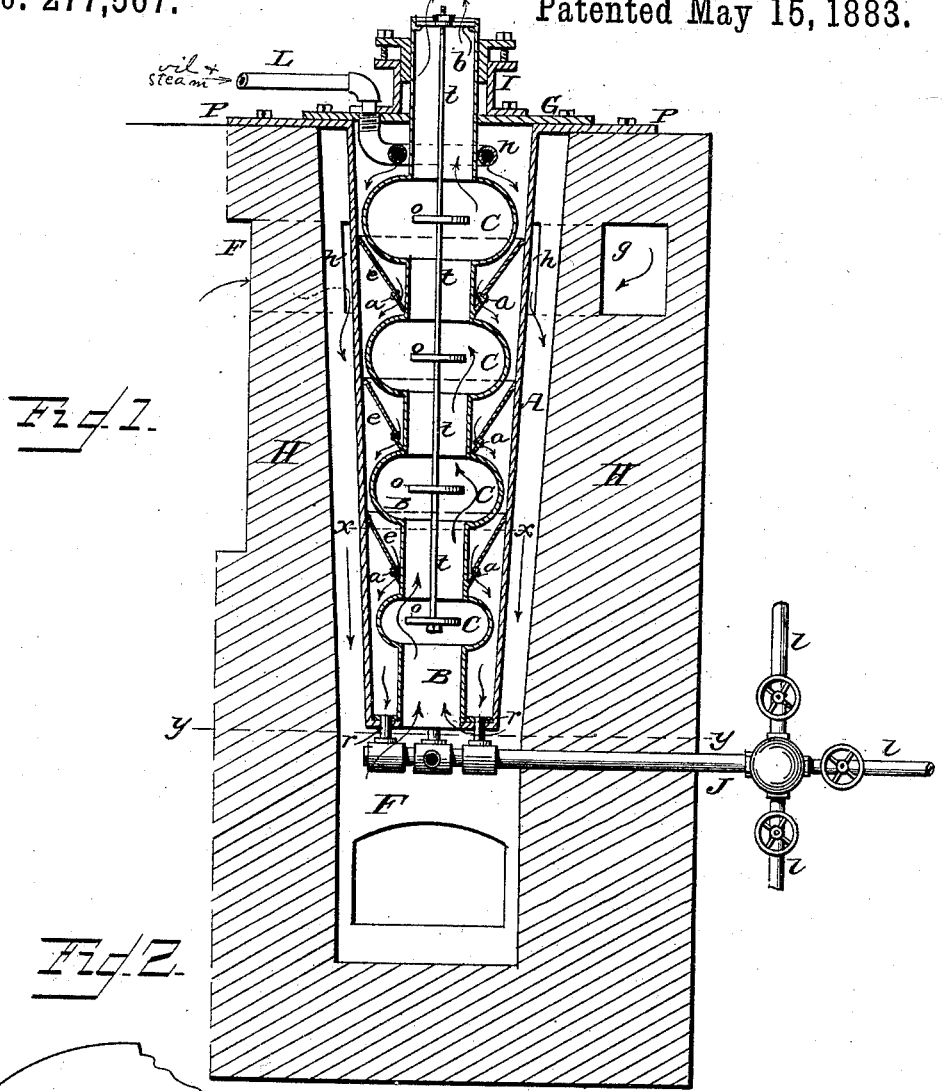
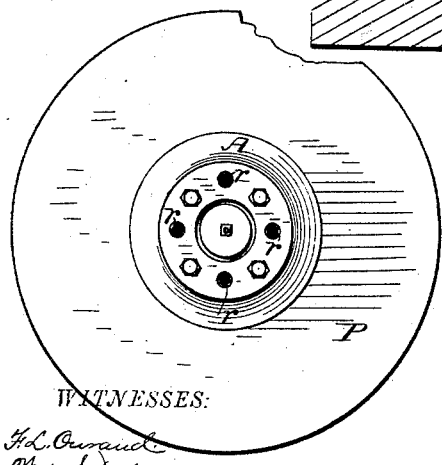
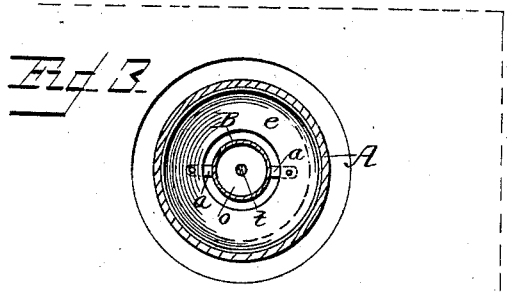
WITNESSES:
INVENTOR.

United States Patent Office.

HENRY F. HAYDEN, OF WASHINGTON, D. C., ASSIGNOR OF TWO-THIRDS TO JOHN A. LOGAN, OF CHICAGO, ILL., AND JOHN T. MORGAN, OF SELMA, ALA.

APPARATUS FOR GENERATING GAS AND VAPOR FROM LIQUID HYDROCARBONS.

SPECIFICATION forming part of Letters Patent No. 277,567, dated May 15, 1883.

Application filed March 31, 1883. (No model.)

*To all whom it may concern:*

Be it known that I, HENRY F. HAYDEN, of Washington, in the District of Columbia, have invented certain Improvements in Apparatus for Generating Gas and Vapor from Liquid Hydrocarbons, of which the following is a specification.

My present invention relates to retorts or generators for the generation or formation of vapor or gas from liquid hydrocarbons; and the invention consists in certain novel features in the construction of the generator, as hereinafter more fully set forth.

Figure 1 is a central vertical section of my improved generator set in position for use. Fig. 2 is a bottom view taken on the line *y y*. Fig. 3 is a transverse section on the line *x x* of Fig. 1.

The generator in this case is constructed on the same general plan of that described in my application filed February 26, 1883—that is to say, it has a smoke or heat flue extending from the bottom up through the center of the generator; but this has certain additional features designed to more effectually utilize the heat, and thereby make it operate more efficiently and economically in the production of the vapor or gas.

In the accompanying drawings, A represents the body of the generator, said body consisting of a conical shell of cast-iron, having a flange, P, at its upper end, by which it is supported upon the surrounding walls of a flue, F, in which the generator is suspended, as shown in Fig. 1, in which H indicates a portion of the walls of a furnace, of any suitable description, and which, not forming any part of this invention, is therefore not shown. The body or shell A is provided at its lower end with an internal annular flange, to which is bolted the central tube or flue, B, as shown in Figs. 1 and 2, this flue or tube B extending up through the top plate, G, where it passes through a stuffing-box, I, the same as in my application hereinbefore referred to. This central tube, B, instead of being made straight and of uniform diameter, as in the former case, is provided with a series of enlargements or chambers, C, as shown in Fig. 1, these chambers being elliptical, as shown, or spherical, as may be preferred, they increasing in diameter from the bottom upward, as shown, so as to correspond with the increasing diameter of the shell or body A. They should be of such a size as to leave an annular space of about one-fourth of an inch between their exterior and the adjoining interior wall of the body A, these spaces being increased slightly as they approach the top.

A series of conical tubes, *e*, are arranged within the body A in such a manner as to alternate with the chambers C of the central tube, B, as shown in Fig. 1, these conical tubes *e* being of such a diameter as to fit against the interior of the body A at their upper ends, while at their lower ends there is left an annular space of about one-sixteenth of an inch in width between their inner edges and the outer surface of the central tube, B, these conical tubes *e* being secured to two or more arms, *a*, which project laterally from the sides of tube B, as shown in Figs. 1 and 3, by which they will all be attached to the central tube, B, so that the whole can be lifted out together whenever desired. In order to get these tubes *e* into the position shown between the chambers or enlargements C of tube B, the latter may be made in sections and screwed together, the conical tubes *e* being slipped on as the sections are united; or the tube B, with its enlargements or chambers C, may be cast complete and the conical tubes *e* be made in two sections divided vertically, so they can be applied without difficulty, this being a matter of choice. The former will, however, be preferred as the better plan.

Within the central tube B, I arrange a series of circular plates, *o*, which are mounted on a rod, *t*, and so adjusted thereon that one of said plates shall be held suspended at the center vertically of each of the chambers C, as shown in Fig. 1, the rod *t* being supported at its upper end by a cross-bar or spider, *b*, arranged within the tube B. These plates *o*, thus arranged, act as dampers to prevent the direct ascent of the products of combustion through the tube B, and by deflecting the heat products, as indicated by the arrows, cause them to spread outward against the walls of the chambers C, thereby more effectually and evenly heating the same. By this construction it will